US012526833B2

(12) United States Patent
Matsumura et al.

(10) Patent No.: US 12,526,833 B2
(45) Date of Patent: Jan. 13, 2026

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 173 days.

(21) Appl. No.: 17/755,947

(22) PCT Filed: Nov. 13, 2019

(86) PCT No.: PCT/JP2019/044607
§ 371 (c)(1),
(2) Date: May 12, 2022

(87) PCT Pub. No.: WO2021/095181
PCT Pub. Date: May 20, 2021

(65) Prior Publication Data
US 2022/0393756 A1 Dec. 8, 2022

(51) Int. Cl.
| | | |
|---|---|---|
| *H04B 7/15* | (2006.01) | |
| *H04B 7/155* | (2006.01) | |
| *H04W 16/26* | (2009.01) | |
| *H04W 16/28* | (2009.01) | |
| *H04W 72/044* | (2023.01) | |
| *H04W 72/54* | (2023.01) | |
| *H04W 72/542* | (2023.01) | |

(52) U.S. Cl.
CPC ...... *H04W 72/542* (2023.01); *H04B 7/15514* (2013.01); *H04W 16/26* (2013.01); *H04W 16/28* (2013.01); *H04W 72/046* (2013.01); *H04W 72/54* (2023.01)

(58) Field of Classification Search
CPC .. H04L 5/0048; H04B 7/15514; H04W 72/54; H04W 72/046
See application file for complete search history.

(56) References Cited

U.S. PATENT DOCUMENTS

2015/0327265 A1  11/2015  Lee et al.
2016/0337056 A1* 11/2016  Frenne ................. H04W 24/10
(Continued)

FOREIGN PATENT DOCUMENTS

CA       3088941 A1    7/2019
WO    2019198249 A1   10/2019

OTHER PUBLICATIONS

Partial supplementary European search report issued in European Application No. 19952400.0, dated Jun. 23, 2023 (11 pages).
(Continued)

*Primary Examiner* — Sulaiman Nooristany
(74) *Attorney, Agent, or Firm* — Osha Bergman Watanabe & Burton LLP

(57) ABSTRACT

A terminal according to an aspect of the present disclosure includes: a receiving section that receives at least part of DL transmission transmitted from a network, via a relay apparatus; and a control section that controls reception of the DL transmission, based on at least one of information related to the relay apparatus transmitted from the network and reception qualities of a plurality of periods. According to an aspect of the present disclosure, it is possible to appropriately control a terminal and a network even in a case of using a relay apparatus.

7 Claims, 15 Drawing Sheets

(56) References Cited

U.S. PATENT DOCUMENTS

| | | | |
|---|---|---|---|
| 2019/0173534 A1* | 6/2019 | Kakishima | H04L 5/0048 |
| 2019/0181943 A1 | 6/2019 | Liang et al. | |
| 2020/0052775 A1* | 2/2020 | Nam | H04L 5/14 |
| 2020/0344813 A1* | 10/2020 | Li | H04B 7/0695 |
| 2020/0350693 A1* | 11/2020 | Balakrishnan | H01Q 15/148 |
| 2020/0350975 A1 | 11/2020 | Siomina et al. | |
| 2021/0112581 A1* | 4/2021 | Hampel | H04W 72/23 |

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).

International Search Report issued in International Application No. PCT/JP2019/044607, mailed Dec. 10, 2019 (3 pages).

Written Opinion issued in International Application No. PCT/JP2019/044607; Dated Dec. 10, 2019 (3 pages).

Extended European Search Report issued in counterpart European Patent Application No. 19952400.0, mailed on Sep. 25, 2023 (10 pages).

* cited by examiner

RELAY DIRECTION APPLICATION TIME SECTIONS

CASE WHERE NUMBER OF CANDIDATES FOR RELAY DIRECTION IS 3

| CONFIGURATION | LENGTH OF PERIOD | CYCLE OF PERIOD | NUMBER OF PERIODS |
|---|---|---|---|
| #1 | 1 SYMBOL | 1 SLOT | 2 |
| #2 | 2 SYMBOLS | 1 SLOT | 2 |
| #3 | 1 SLOT | 5 SLOTS | 4 |
| #4 | 2 SLOTS | 5 SLOTS | 2 |
| ⋯ | ⋯ | ⋯ | ⋯ |

FIG. 9

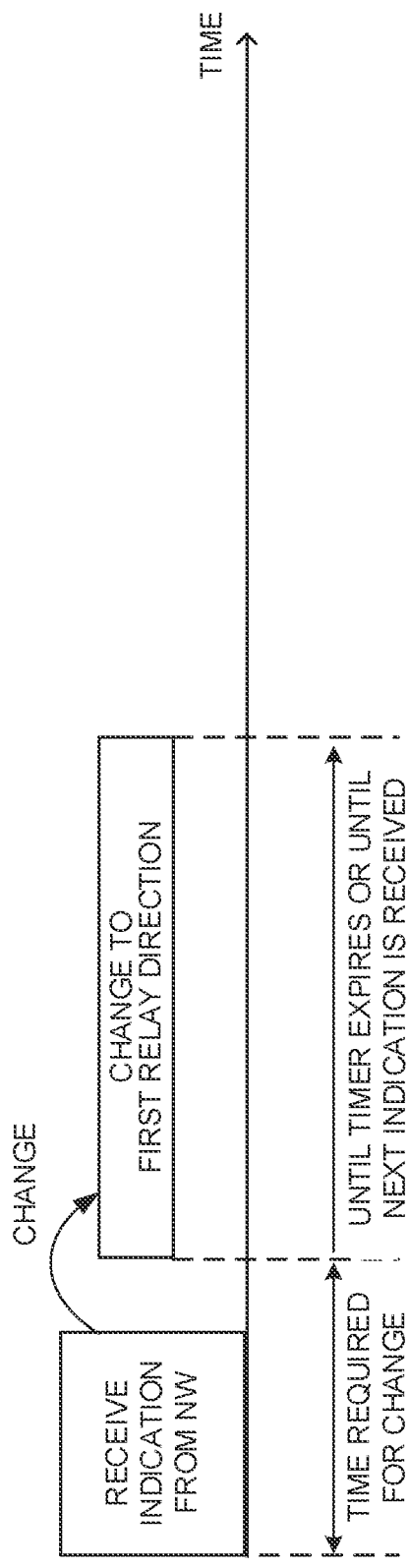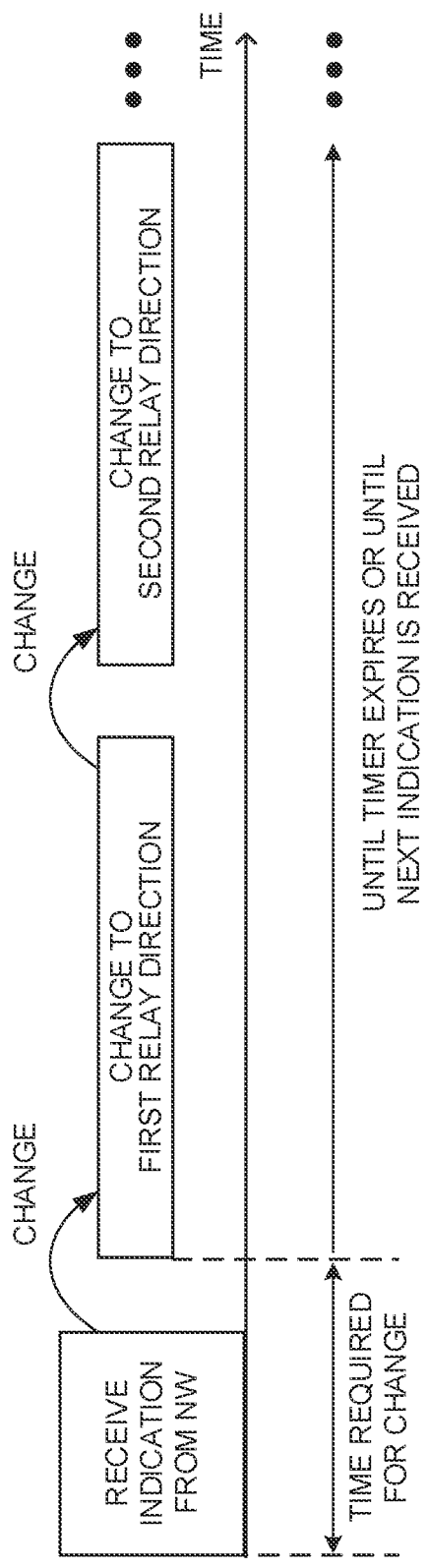

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In existing LTE systems (e.g., LTE Rel. 8 to Rel. 15), a user terminal (User Equipment (UE)) maps an uplink signal to an appropriate radio resource to transmit the uplink signal to a base station (e.g., a gNB). Uplink user data (e.g., a UL-SCH) is transmitted using an uplink shared channel (Physical Uplink Shared Channel (PUSCH)). Uplink control information (UCI) is transmitted using a PUSCH in a case of transmitting the uplink control information together with uplink user data while being transmitted using an uplink control channel (Physical Uplink Control Channel (PUCCH)) in a case of being transmitted solely.

Channel state information (CSI) included in the UCI is information based on an instantaneous downlink channel state and is, for example, a channel quality indicator (CQI), a precoding matrix indicator (PMI), a precoding type indicator (PTI), a rank indicator (RI), or the like. The CSI is notified for the UE to the base station periodically, aperiodically, or semi-persistently.

In a case of periodic CSI (P-CSI), the UE periodically transmits the CSI, based on a period and/or resource notified from the base station. In contrast, in a case of aperiodic CSI (A-CSI), the UE transmits the CSI according to a CSI report request (also referred to as a trigger, a CSI trigger, a CSI request, and the like) from the base station. The CSI report request is transmitted in downlink control information (DCI), for example.

In existing LTE systems (LTE Rel. 8 to Rel. 14), monitoring of radio link quality (radio link monitoring, RLM) is performed. When detecting a radio link failure (RIF) through the RLM, re-establishment of RRC (Radio Resource Control) connection is requested to the UE.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For NR, it is studied to perform communication by using beamforming. For example, the UE and the base station may use a beam used for transmission of a signal (also referred to as a transmit beam, a Tx beam, and the like) and a beam used for reception of a signal (also referred to as a receive beam, an Rx beam, and the like).

However, in a case of using beamforming, it is likely to receive an influence of disturbance by a shield (obstacle), which may make it difficult area construction for non-line of sight of base station antennas. As a solution to such a problem, reflection or relay of a radio wave is used.

The reflection or relay of a radio wave is performed mainly by a relay apparatus (also referred to as a signal reflection relay apparatus, a reflector, a metamaterial reflector, a metal reflector, a repeater, a relay, a relay terminal, a relay base station, and the like). In a case of using such an apparatus, it is necessary to appropriately control the relay apparatus, the UE, and the network (a NW, for example, a base station). However, communication control using a relay apparatus in NR is not sufficiently studied.

Thus, an object of the present disclosure is to provide a terminal and a radio communication method that can appropriately control a UE and a NW even in a case of using a relay apparatus.

Solution to Problem

A terminal according to an aspect of the present disclosure includes: a receiving section that receives at least part of DL transmission transmitted from a network, via a relay apparatus; and a control section that controls reception of the DL transmission, based on at least one of information related to the relay apparatus transmitted from the network and reception qualities of a plurality of periods.

Advantageous Effects of Invention

According to an aspect of the present disclosure, it is possible to appropriately control a UE and a NW even in a case of using a relay apparatus.

BRIEF DESCRIPTION OF DRAWINGS

FIG. 9 is a diagram to show an example of a correspondence relationship of rules for the relay apparatus to determine relay directions and relay direction application time sections;

FIGS. 10A and 10B are each a diagram to show an example of a timeline of operation of the relay apparatus;

DESCRIPTION OF EMBODIMENTS (RLF)

Figure 1:
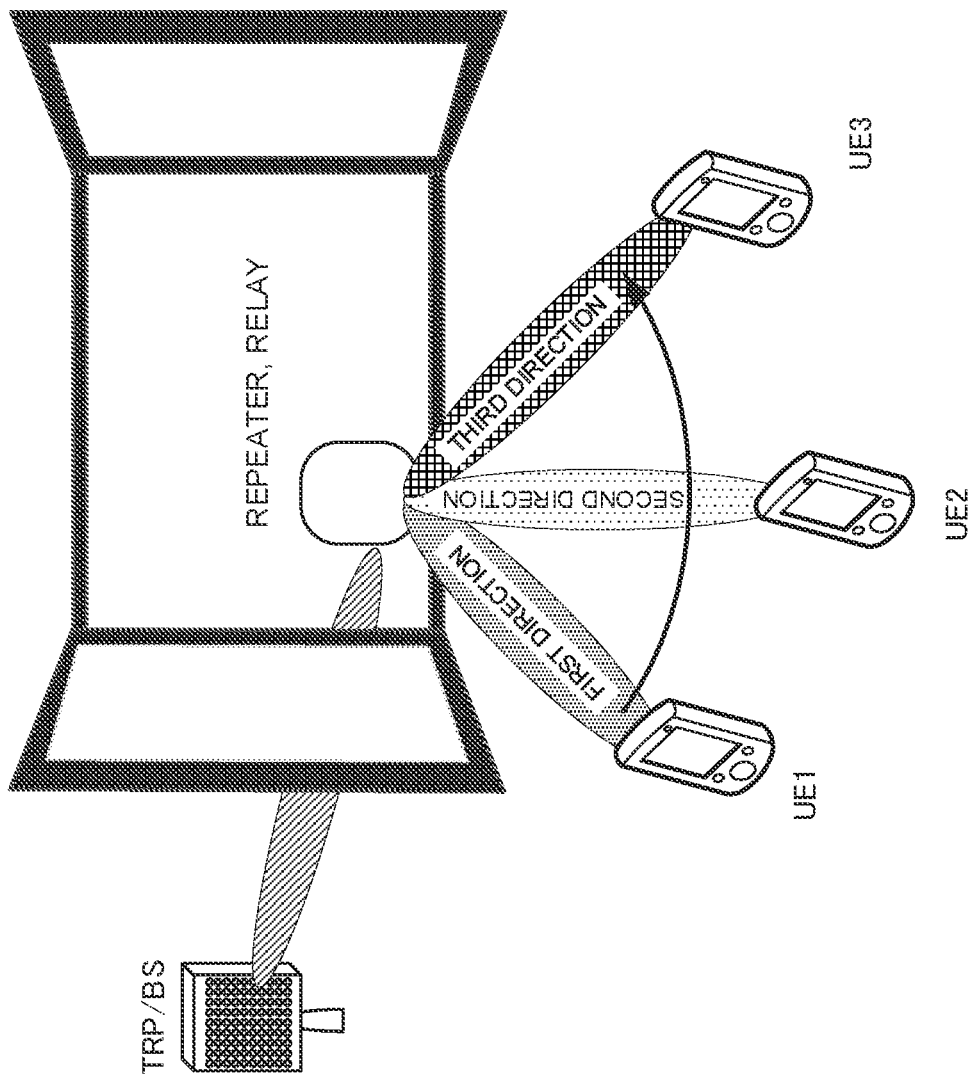
FIG. 1 is a diagram to show an example of an overview of relay of a radio wave by a repeater or a relay.

For NR, it is studied to perform communication by using beamforming. For example, the UE and the base station may use a beam used for transmission of a signal and a beam used for reception of a signal.

In a case of using beamforming, it is likely to receive an influence of disturbance by a shield (obstacle), and is hence assumed that radio link quality is deteriorated. Due to the deterioration in radio link quality, a radio link failure (RLF) may frequently occur. When an RLF occurs, cell reconnection is needed. Hence, if an RLF occurs frequently, this leads to deterioration in system throughput.

For NR, to suppress occurrence of an RLF, it is studied to perform, when the quality of a particular beam deteriorates, a procedure for switching to another beam (which may also be referred to as beam recovery (BR), beam failure recovery (BFR), L1/L2 (Layer 1/Layer 2) beam recovery, and the like). Note that a BFR procedure may be simply referred to as BFR.

Note that the radio link failure (RLF) in the present disclosure may be referred to as a link failure, a beam failure (BF), and the like.

(TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (expressed as a signal/channel below) in the UE, based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, and the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): spatial reception parameter.

A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel being a target (in other words, a reference signal (RS) for the channel) and another signal (for example, another RS). The TCI state may be configured (indicated) by higher layer signaling or physical layer signaling, or a combination of these.

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state or the spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

An RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state ("TCI-state IE" of RRC) configured using higher layer signaling may include one or a plurality of pieces of QCL information ("QCL-Info"). The QCL information may include at least one of information related to the RS to have a QCL relationship (RS relation information) and information indicating a QCL type (QCL type information). The RS relation information may include information such as an index of the RS (for example, an SSB index, or a non-zero power CSI-RS (NZP CSI-RS) resource ID (Identifier)), an index of a cell in which the RS is located, and an index of a Bandwidth Part (BWP) in which the RS is located.

In Rel. 15 NR, as a TCI state of at least one of a PDCCH and a PDSCH, both an RS of QCL type A and an RS of QCL type D or only the RS of QCL type A can be configured for the UE.

In a case where a TRS is configured as the RS of QCL type A, it is assumed that, unlike a demodulation reference signal (DMRS) for the PDCCH or the PDSCH, the same TRS is transmitted periodically for a long time period. The UE can measure the TRS to calculate average delay, delay spread, and the like.

The UE configured with the TRS as the RS of QCL type A in the TCI state of the DMRS for the PDCCH or the PDSCH can assume that the DMRS for the PDCCH or the PDSCH and a QCL type A parameter (such as average delay, delay spread, or the like) of the TRS are the same, and can hence obtain the type A parameter (such as average delay or delay spread) of the DMRS for the PDCCH or the PDSCH from a measurement result of the TRS. In channel estimation of at least one of the PDCCH and the PDSCH, the UE can use a result of the measurement of the TRS to perform more accurate channel estimation.

The UE configured with the RS of QCL type D can determine a UE receive beam (a spatial domain reception filter or a UE spatial domain reception filter) by using the RS of the QCL type D.

The RS of QCL type X in the TCI state may mean an RS having a relation of QCL type X with (a DMRS of) a certain channel/signal, and this RS may be referred to as a QCL source of QCL type X in the TCI state.

(Relay Apparatus)

For NR, it is studied to perform communication by using beamforming. For example, the UE and the base station may use a beam used for transmission of a signal and a beam used for reception of a signal.

However, in a case of using beamforming, it is likely to receive an influence of disturbance by a shield (obstacle), which may make it difficult area construction for non-line of sight of base station antennas. As a solution to such a problem, reflection or relay of a radio wave is used.

As a technique for reflecting or relaying a radio wave, a metal reflector has been used. In a case of using a metal reflector, to control the angle of a reflected wave of a radio wave, the metal reflector needs to be installed according to the direction of the incidence angle of the radio wave. In such a case, installation in urban areas and the like where a large number of reflectors need to be installed is difficult, which leads to limitation to particular usage in suburbs and the like.

Meanwhile, to aim at expansion of coverage areas for future radio communication systems (for example, NR of Rel. 16 or a later version), it is studied to make use of a reflector to which a metamaterial technique is applied (a metamaterial reflector).

Metamaterial is an artificial material made by using a metal structure of a nanosize to artificially add electromagnetic properties that natural material does not have.

By the metamaterial reflector including extremely small structures arranged in an array with respect to the wavelength of a radio wave and the structures having different shapes depending on installation sites, it is possible to design the direction of a reflected wave and a beam shape freely. In a case of using the metamaterial reflector, by installing the metamaterial reflector on an external wall of a building, a reflected wave can be guided to a particular direction. Hence, it is possible to expand coverage areas in high traffic areas without limiting installation sites in urban areas and the like.

It is also expected to expand coverage areas by using repeaters, relays, signal amplifiers, and the like, which are known techniques. FIG. 1 is a diagram to show an example of an overview of relay of a radio wave by a repeater or a relay. FIG. 1 shows a state in which the repeater (relay) installed in a building relays a radio wave between a transmission/reception point (TRP) (or a base station (BS)) and terminals. The repeater performs beam sweeping in directions to the UEs 1 to 3 (first to third directions) on a signal received from the TRP, to secure coverage.

In view of this, by dynamically or semi-statically controlling the relay direction (reflection direction) of a radio wave by a repeater or the like (hereinafter, a relay apparatus) having the function of the metal reflector, the metamaterial reflector, or the like, it is possible to expand coverages more flexibly.

Here, dynamically or semi-statically controlling the relay direction (reflection direction) of a radio wave may be equal to mechanically controlling the reflection direction in a case of the metal reflector, for example. This may be equal to electrically or electronically controlling the reflection direction in a case of the metamaterial reflector, for example. This may be achieved by amplifying a signal and transmitting a relay signal in any direction by an array antenna, beamforming, or the like as in a case of the relay, the repeater, or the like.

Here, the relay apparatus may assume to be connected to a network through a backhaul (wired or wireless) or may assume that the relay apparatus performs sweeping in the reflection direction autonomously.

Figure 2:
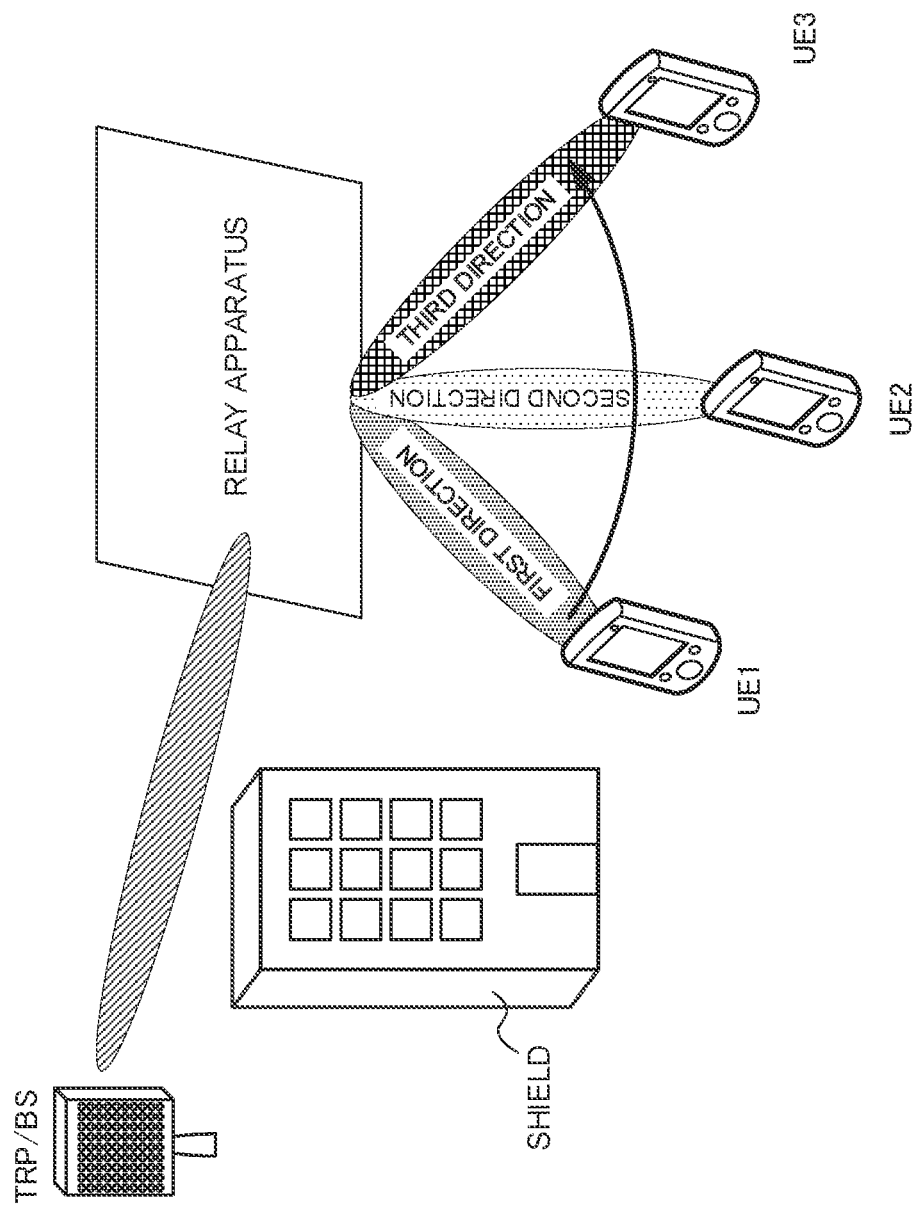
FIG. 2 is a diagram to show an example of an overview of relay of a radio wave by a relay apparatus.

FIG. 2 is a diagram to show an example of an overview of relay of a radio wave by a relay apparatus. FIG. 2 shows that, in a case where a shield (for example, a building) is present between the TRP (or the base station) and the UEs, communication between the TRP and the UEs is possible by using the relay apparatus. Also in this case, similarly to FIG. 1 described above, the relay apparatus performs beam sweeping in the directions to the UEs 1 to 3 (first to third directions) to secure coverage.

In a case of performing control of the relay apparatus, based on operation by a NW (the UE is not notified of the control of the relay apparatus), time sections (periods) in which the UE cannot communicate (for example, is located out of communicable range) may occur in some control states of the relay apparatus, and this may cause such an inefficient situation that the UE performs initial access in reconnection operation of the UE.

In the case of performing control of the relay apparatus, based on the operation by the NW (the UE is not notified of the control of the relay apparatus), the UE can assume that channel state information (CSI) of the relay apparatus measured at the time of being in a certain reflection direction and CSI measured at the time of being in another reflection direction are different from each other. Hence, the UE may not be able to perform appropriate communication without considering an influence of the control of the relay apparatus at least with respect to CSI measurement.

However, even in a case where the UE is notified of the control of the relay apparatus, it is not sufficiently studied how the NW notifies the UE. Moreover, it is not sufficiently studied how to control operation of the UE notified of the control of the relay apparatus. In such a case, the UE and the NW may not be able to perform appropriate communication.

In view of the above respects, the inventors of the present invention came up with a method of appropriately controlling a UE and a NW even when a relay apparatus is used.

Embodiments according to the present disclosure will be described in detail with reference to the drawings as follows. The radio communication methods according to respective embodiments may each be employed individually, or may be employed in combination.

(Radio Communication Method)

In the following, description will be given of information related to a relay apparatus of which the UE is notified (a first aspect), operation of the UE (a second aspect), and control of the relay apparatus by a NW (a third aspect), in a radio communication method.

The relay apparatus in the present disclosure may be interpreted as a signal reflection relay apparatus, a signal reflection apparatus, a reflection apparatus, a signal reflection base station, a signal reflection terminal, a reflector, a metamaterial reflector, a metal reflector, a repeater, a relay, a relay terminal, a relay base station, and the like.

The relay apparatus in the present disclosure may include at least part of functions and a structure of a user terminal or a radio base station. Hence, the relay apparatus in the present disclosure may be treated as the user terminal or may be treated as the radio base station.

In the following description, a received quality (for example, Reference Signal Received Quality (RSRQ)) may be interpreted as a received power (for example, Reference Signal Received Power (RSRP), a Signal to Interference plus Noise Ratio (SINR), a Signal to Noise Ratio (SNR)), a signal strength (for example, Received Signal Strength Indicator (RSSI)), and so on.

<First Aspect>

In a first aspect, the information related to the relay apparatus of which the UE is notified will be described.

The UE may recognize at least the presence of the relay apparatus. For example, the UE may be notified of the presence of the relay apparatus by at least one of the NW and the relay apparatus. Alternatively, the UE may identify the presence of the relay apparatus, based on a DL signal that the UE itself has received (for example, from a result of measurement of a reference signal).

Even when at least channels, reference signals (RSs), or frequencies are the same, the UE may assume that at least reflections, beams, TCI states, or spatial relations may be different from each other in terms of time.

The UE may assume to be configured with information related to the relay apparatus about time section (also referred to as period below) by the NW or may make determination based on measurement of an RS. For example, the information related to the relay apparatus about time section may be at least one of the length of one or more periods and the cycle to the same period (the cycle from the n-th period to the next n-th period (n=1, 2, 3, . . . )).

Figure 3:
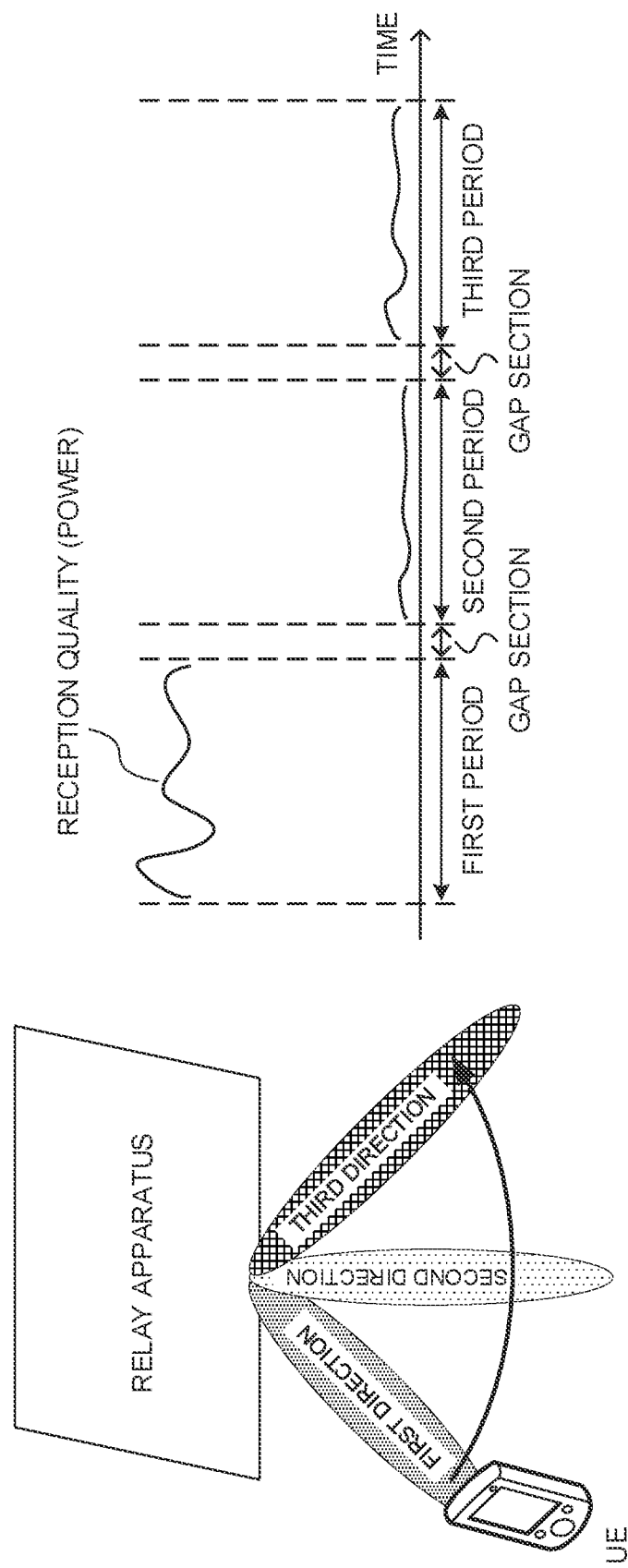
FIG. 3 is a diagram to show an example of correspondence of relay directions, relay direction application time sections, and reception qualities by the relay apparatus.

FIG. 3 is a diagram to show an example of correspondence of relay directions, relay direction application time sections, and reception qualities by the relay apparatus. For example, in FIG. 3, the information related to the relay apparatus about time section may be the lengths of the first to third periods. Alternatively, the information related to the relay apparatus about time section may be the cycle from the n-th period to the next n-th period (n=1, 2, 3).

A gap section may be provided between adjacent time sections. The lengths of a plurality of gap sections may be the same in time or may be different from each other in time. No gap section may be provided between adjacent time sections. Note that the gap section may be defined in a specification, may be reported in UE capability, may be notified or configured by the NW, or may be provided in combination of these. Note that the gap section may be defined, reported, notified, or configured using the number of symbols, or may be defined, reported, notified, or configured using absolute time. The gap section may be defined, reported, notified, or configured for each subcarrier spacing (numerology) or may have a fixed value irrespective of subcarrier spacing (numerology). The gap section may be defined, reported, notified, or configured for each frequency band.

In FIG. 3, the relay apparatus sweeps (changes) the relay direction (reflection direction) of a radio wave from a first direction to a second direction and third direction, and then sweeps (changes) the relay direction to the first direction again. When the relay direction is the first direction, this corresponds to the first period; when the relay direction is the second direction, this corresponds to the second period; when the relay direction is the third direction, this corresponds to the third period.

For example, even when at least channels, RSs transmitted in, or frequencies used for transmission in different periods (the first period, the second period, and the third period) are the same, at least reflections, beams, TCI states, or spatial relations may be different from each other.

Note that, in the present disclosure, a case where the number of relay directions of the relay apparatus is three is shown as an example, but the number of relay directions is not limited to this. The number of relay directions of the relay apparatus may be two or smaller or may be four or greater.

For the UE to make determination about time section through measurement, a specific RS (for example, a Detection RS) or an existing downlink reference signal (DL RS) resource may be configured. For example, the existing DL RS resource may be a synchronization signal block (SSB), a channel state information reference signal (CSI-RS), a CSI-RS for tracking (TRS), or the like. The UE may measure the received power and reception quality of the RS, to identify at least one of the length of the period and the cycle of the period. In a case of identifying the relay apparatus, the UE itself can improve the overhead of signaling by the NW.

The UE may obtain at least one of (1) to (4) below of the information related to the relay apparatus to be described below.

(1) Presence of relay apparatus (whether a relay apparatus is adapted)

(2) The number of candidates for a relay direction (reflection direction)

(3) Relay direction (reflection direction) index applied (corresponding) to a transmission/reception period of at least one of an RS and data (4) Relay direction (reflection direction) index and applied time section (including gap section)

Here, the UE may be notified of the relay direction (reflection direction) index adapted (corresponding) to a transmission/reception period of at least one of an RS and data, as at least one of QCL information between an RS and an RS, TCI state, spatial relation, and an RS index.

Figure 4B:
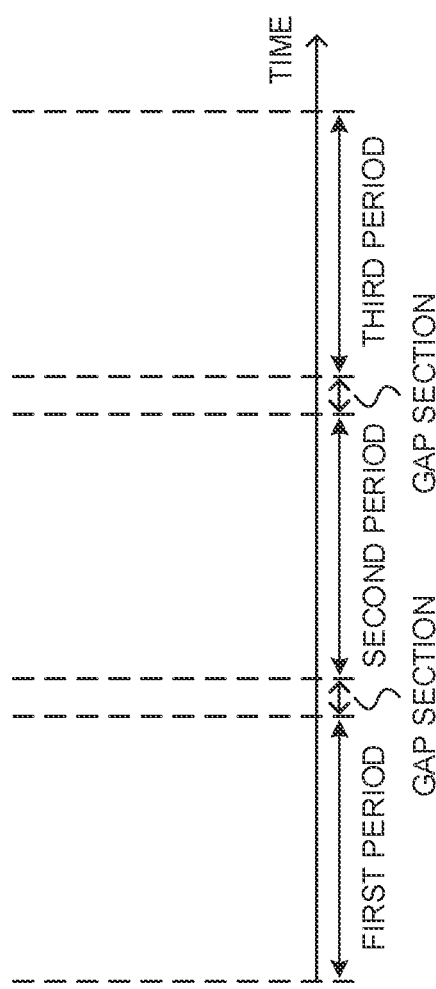
FIGS. 4A and 4B are diagrams to show an example of the relay directions and the relay direction application time sections by the relay apparatus.
Figure 4A:
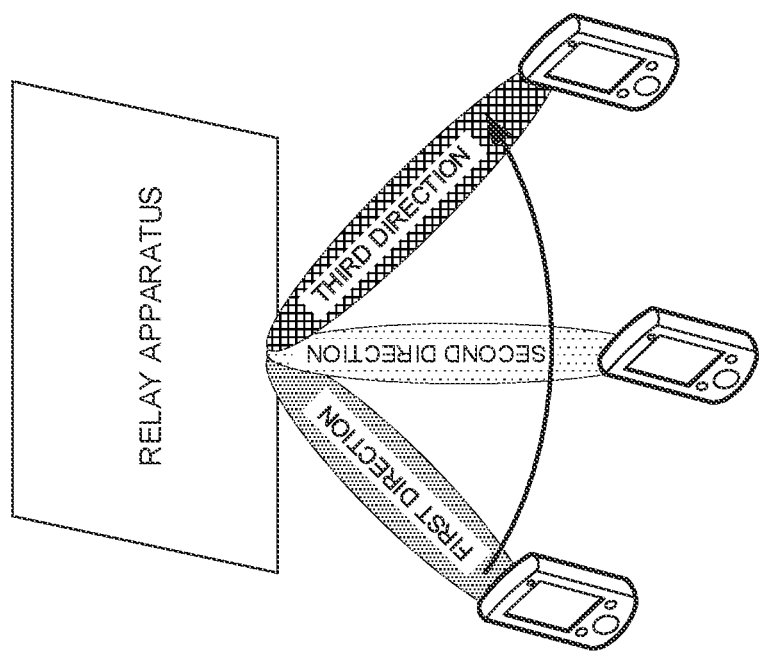

FIGS. 4A and 4B are diagrams to show an example of the relay directions and relay direction application time sections by the relay apparatus. For example, in such a case as that in FIG. 4A, the number of candidates for a relay direction is three. FIG. 4B stows an example of time sections to which the relay directions are applied, each time section corresponding to the relay direction. In the present disclosure, the lengths of the time sections to which the relay directions are applied may be the same or may be different from each other.

The UE may be notified of the information related to the relay apparatus by the NW through a broadcast signal (or a broadcast channel). The UE may be notified of the information related to the relay apparatus by the NW through higher layer signaling. The UE may be notified of the information related to the relay apparatus by the NW through physical layer control signaling. The UE may be noted of the information related to the relay apparatus by a combination of higher layer signaling and physical layer control signaling by the NW.

The UE may measure a specific RS to implicitly detect the information related to the relay apparatus. For example, in a case where an RS for which a QCL relation is notified is measured in a plurality of time periods and there is a large difference from a certain value in at least one of the received power and reception quality of the measured RS, the UE may assume that sweeping in the relay direction is performed.

At least one of the relay direction index and the applied time section may be notified through higher layer signaling (for example, broadcast information, RRC signaling, or MAC signaling) or may be notified through DCI. At least one of the relay direction index and the applied time section may be notified by interpreting a certain field value of existing DCI or may be implicitly notified through a PDCCH resource (for example, a CCE index) or the like.

The relay apparatus may implicitly notify the UE of at least one of the relay direction index and the applied time section in a certain rule without notifying the UE of this. The rule may be, for example, a rule that switching is performed in a certain time unit from the beginning of a certain time section. The certain time section may be subframe, slot, subs-lot, or the like. The certain time unit may be an n millisecond(s) (n is any value), slot, sub-slot, symbol, or the like.

The UE may be notified of the relay direction as part of beam information such as a TCI state and spatial relation, or a new concept such as a relay direction, a wide beam, or a narrow beam may be defined. For example, a beam used between the NW and the relay apparatus may correspond to an existing beam or a wide beam. For example, a beam used between the relay apparatus and the UE may correspond to a narrow beam.

In other words, the beam used between the NW and the relay apparatus may be switched in two levels of beam used between the relay apparatus and the UE, for beam management. For example, a beam (wide beam) used between the relay apparatus and the UE may use a beam of a specific value (for example, 16, 64, or the like). For example, a beam (narrow beam) used between the relay apparatus and the UE may use a beam of a specific value (for example, 3 or the like).

Note that, in the first aspect, the UE may receive a control indication from the NW to the relay apparatus in a third aspect to be described later, to be implicitly notified.

The information related to the relay apparatus received (recognized) by the UE may be interpreted as information related to reception quality received by the UE.

<Second Aspect>

In a second aspect, operation of a UE that has recognized relay direction control of the relay apparatus will be described. In the second aspect, the UE may be notified of a certain time section by the NW. For example, the certain time section may be a time section having a high reception quality (for example, the first period in FIG. 3). For the time section having a high reception quality (for example, the first period in FIG. 3), the UE may be notified of a threshold for a candidate of a certain specific time section or a reception quality by the NW and identify a time section having a high reception quality, based on the notification.

<<Aspect 2-1>>

In radio link monitoring (RLM), the UE may perform RLM only for a specific time section. For example, in FIG. 3, the UE may perform RLM only in the first period. The time section to perform measurement for the RLM may be newly configured by a higher layer parameter or the like.

The UE may perform RLM for each time section and perform timer (configuration for timer), calculation and measurement of received power (quality), management of RLM, and detection of a radio link failure (RLF) independently for each time section.

For example, in FIG. 3, the UE performs RLM in the first period, the second period, and the third period. In a case where no RLF occurs in the first period while an RLF occurs in each of the second period and the third period, the UE may invoke or detect, when an RLF occurs in at least one of the periods, the RLF. For example, the UE may report, to the NW, each of the RLF detected in the second period and the RLF detected in the third period.

In a case where no RLF occurs in the first period while an RLF occurs in each of the second period and the third period and the UE recognizes a period in which no RLF occurs (for example, the first period in FIG. 3), the UE need not necessarily invoke or detect an RLF in other periods (for example, the second and third periods in FIG. 3). This enables efficient detection of an RLF and can consequently reduce power consumption of the UE.

In the time period in which no time section is configured, the UE may regard the time period not to be a time section having a high reception quality and perform similar operation to that for a time section not having a high reception quality. In the time period in which no time section is configured, the UE may perform similar operation to that for a case with no restriction for a time section (for example, Rel. 15 or a previous version).

According to Aspect 2-1, the UE can appropriately perform report of detection of an RLF (for example, transmission of at least one of a random access preamble (PRACH) and a PUCCH).

<<Aspect 2-2>>

The UE may perform CSI measurement only in a specific time section. For example, the UE may perform CSI measurement only in a time section having a high reception quality (a first period in FIG. 5). The time section to perform CSI measurement may be newly configured by a higher layer parameter or the like. Note that reception quality (power) in FIG. 5 is similar to that in FIG. 3.

In this case, operation of the UE can be simplified, and the UE can report only a measurement result having high reliability (high reception quality) to the NW.

The UE may perform CSI measurement for each time section. The UE may hold a result of the measurement for each time section and report part of or all the measurement results to the NW.

Figure 5:
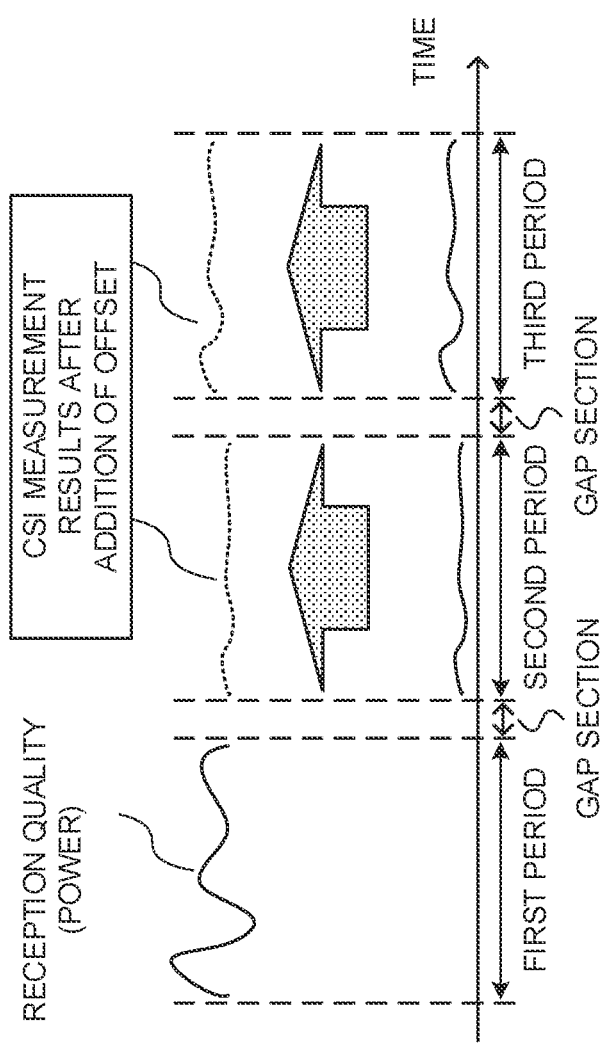
FIG. 5 is a diagram to show an example of correspondence of the relay direction application time sections and the reception qualities.

FIG. 5 is a diagram to show an example of correspondence of the relay direction application time sections and the reception qualities. For example, in FIG. 5, the UE may perform CSI measurement in each of the first to third periods, hold a result of the measurement for each of the time sections, and report part of or all the measurement results to the NW.

In this case, the NW can grasp reception states of the UE for beams used by the relay apparatus and can hence perform data scheduling and the like appropriately.

The UE may perform CSI measurement for each of the time sections, converts the measurement result of each of the time sections according to a certain conversion equation, and report, to the NW, a measurement result obtained through the conversion as a CSI measurement result for the plurality of time sections (for example, the entire time section). For example, as shown in FIG. 5, CSI measurement is performed in each of the first to third periods, and the difference in received power (quality) (here, approximately 10 dB) between the first period and other periods (the second and third periods) is added to CSI measurement results for such other periods, to regulate the quality of each period. After the regulation, processing such as equalization is performed for the entire period (the first to third periods), and the resultant is reported as a CSI measurement result for the entire period to the NW. Here, the difference (here, approximately 10 dB) in received power (quality) may be a value detected by the UE through measurement of a certain RS or may be a value configured by the NW.

In this case, the UE can correct fluctuations in CSI measurement results in terms of time and report the resultant to the NW. The UE performs CSI measurement for the entire time section, which eliminates the necessity of identification of time sections and can hence prevent delay.

To be more specific, a method in which the UE determines (calculates) the difference in received power (quality) between a time section having a high reception quality (the first period) and other time sections (the second and third periods) will be described. The UE is configured with DL RS resources in the time section having a high reception quality and other time sections. The DL RS resources may have a QCL relation with each other. The UE measures DL RSs in each of the time sections and calculates the average value of the received power of the DL RSs in each of the time sections. An offset is calculated based on the calculated average values.

Note that the UE may notify the NW of the offset as at least part of uplink control information (UCI) and a MAC CE.

Figure 6:
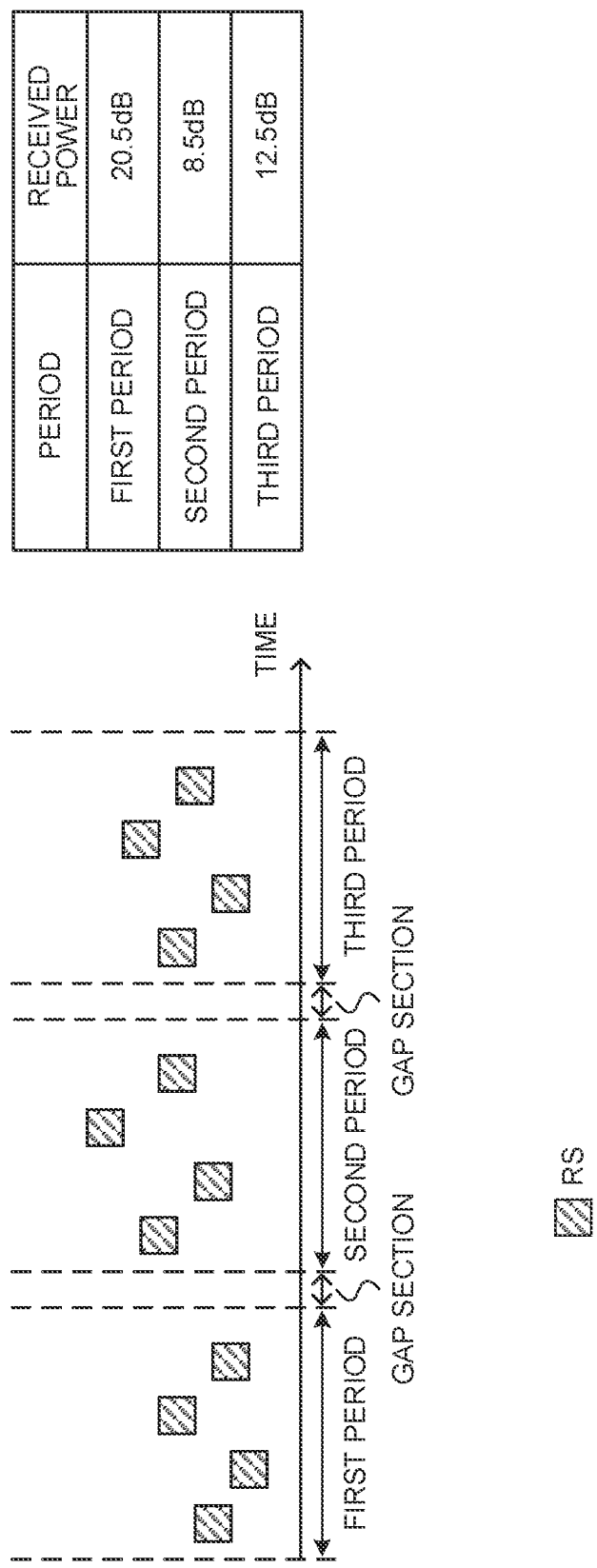
FIGS. 6A and 6B are diagrams to show an example of correspondence of the relay direction application time sections and reference signals and an example of received power measurement results of the reference signals.

FIGS. 6A and 6B are diagrams to show an example of correspondence of the relay direction application time sections and reference signals and an example of received power measurement results of the reference signals. As illustrated in FIG. 6A, for example, the UE is configured with DL RS resources in the first to third periods. An m-th period (m=1, 2, 3) may be noncontiguous, or an n-th period (n=1, 2, 3), which is different from the m-th period, may be interposed between the m-th period and the m-th period. In a case where measurement results of the received power of RSs are as shown in FIG. 6B in the first to third periods, the difference between the value of the received power of the first period, which has the highest received power, and the received power of each of other periods is calculated, and, based on a result of the equalization, the offset is calculated as 10 dB. Note that the assignment positions and the number of RSs in FIG. 6A as well as the number of measurement periods and measurement results in FIG. 6B are merely examples and are not restrictive.

In the method described in Aspect 2-2, the UE may transmit beam report (for example, at least one of Layer 1 (L1)-reference signal received power (RSRP) and Layer 1 (L1)-signal to interference plus noise ratio (SINR)) at a higher frequency than that of report of a CSI measurement result, for example. For example, the UE may transmit beam report (for example, at least one of the L1-RSRP and the L1-SINR) in the entire time section while transmitting report of a CSI measurement result only in a specific time section.

For example, the UE may transmit beam report (for example, at least one of the L1-RSRP and the L1-SINR) at a higher frequency than that of report of a CSI measurement result (for example in the entire time section excluding gap sections) while converting, for other CSI, the measurement result of each time section according to a certain conversion equation, and transmitting the measurement result obtained through the conversion as a CSI measurement result for the entire time section.

<<Aspect 2-3>>

In detection or monitoring of a downlink control channel (for example, a PDCCH), the UE may perform blind detection for a downlink control channel only in a specific time section. The time section to perform the detection or monitoring of a PDCCH may be newly configured by a higher layer parameter or the like.

Figure 7:
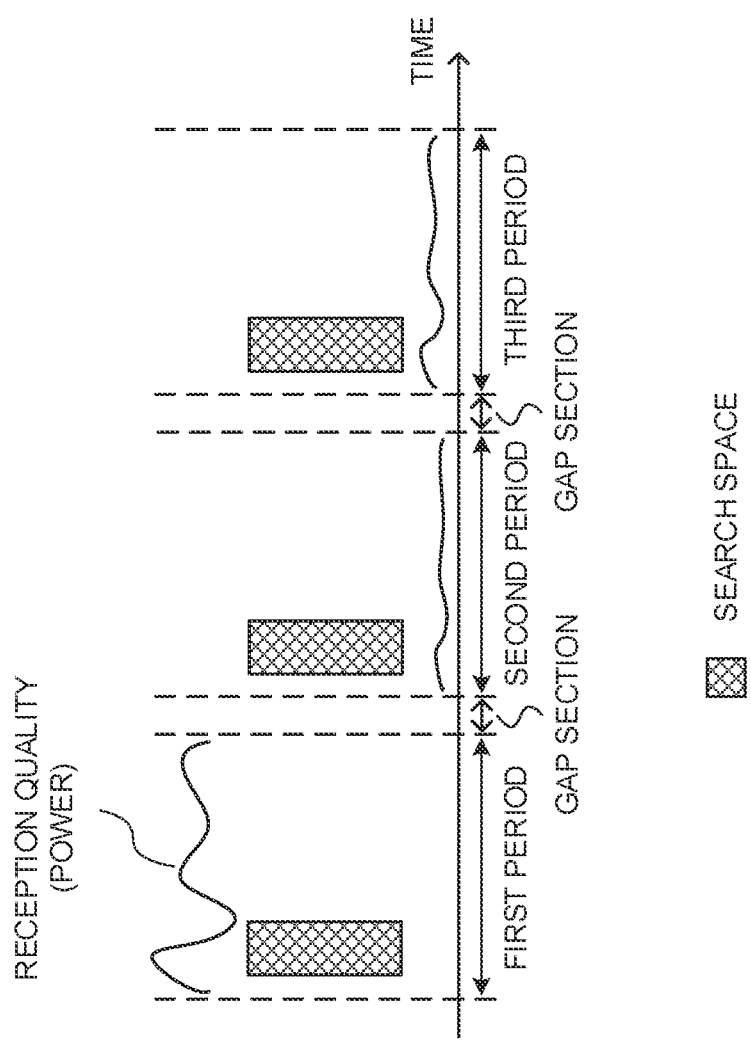
FIG. 7 is a diagram to show an example of correspondence of the relay direction application time sections, search spaces, and the reception qualities.

FIG. 7 is a diagram to show an example of correspondence of the relay direction application time sections, search spaces, and the reception qualities. As shown in FIG. 7, for example, the UE may monitor only a search space (SS) in the first period to perform detection of a PDCCH without monitoring SSs in other periods. In this case, the UE can assume that such other periods are used for scheduling of a PDCCH for other UEs, which can reduce power consumption of the UE. Note that reception quality (power) in FIG. 7 is similar to that in FIG. 3. Note that the positions of the search spaces in FIG. 7 are merely examples and are not restrictive.

For the NW to perform scheduling of a PDCCH for each UE, it is necessary to recognize, for each UE, which time section has a high reception quality. However, by reporting a CSI measurement result to the UE for each time section as described in Aspect 2-2, the NW can recognize, for each UE, a time section having a high reception quality.

In detection or monitoring of a downlink control channel (for example, a PDCCH), the UE may perform blind detection for a downlink control channel irrespective of time section.

As shown in FIG. 7, for example, the UE may monitor search spaces SSs in the first to third periods to perform detection of a PDCCH. In this case, the UE can reduce delay and improve resource efficiency.

Here, in the second and third periods, the UE may monitor a search space of a specific type (for example, a common search space (CSS)) or a control resource set (CORESET) corresponding to the CSS without monitoring a search space of another type (for example, a UE specific search space (USS)) or a control resource set corresponding to the USS.

In the second and third periods, the UE may perform blind detection for DCI (for example, DCI formats 0_0 and 1_0) for a plurality of UEs without performing blind detection for DCI for a specific UE (for example, DCI formats 0_0 and 1_1).

Note that, for the NW to transmit a USS, a UE-specific CORESET, or DCI for a specific UE, the UE may transmit a reference signal for measurement (Sounding Reference Signal (SRS)) to the NW in a plurality of periods (for example, in the entire time section excluding gap sections) for the purpose of recognizing a time section having a high reception quality. In this case, since the power of the SRS received by the NW also fluctuates depending on the relay direction of the relay apparatus, the NW can recognize a time section having a high reception quality.

<<Aspect 2-4>>

The UE may assume that scheduling of a shared channel is performed only in a specific time section in scheduling of a shared channel (for example, a PDSCH or a PUSCH). The time section in which scheduling of the shared channel is performed may be newly configured by a higher layer parameter or the like.

For example, the UE may assume that at least one of a PDSCH and a PUSCH is scheduled only in a time section having a high reception quality (for example, in the first period in FIG. 7).

The UE may assume that scheduling of a shared channel (for example, a PDSCH or a PUSCH) is performed in a plurality of time sections irrespective of time section.

For example, the UE may assume that at least one of a PDSCH and a PUSCH is scheduled only in the entire time section (for example, in the first to third periods in FIG. 7).

In a case where the UE transmits a PUSCH in a configuration grant based manner, the UE may transmit the PUSCH without receiving a scheduling indication from the NW. In this case, the UE may perform transmission of a PUSCH in any time section or may perform transmission of a PUSCH only in a time section having a high reception quality.

<<Aspect 2-5>>

The UE may be configured or indicated independently of a QCL relation for each time section. The UE may assume that the QCL relation is not held in a case where RSs are not configured independently for respective time sections (periodic RSs (Periodic (P)-RSs)) but are transmitted in different time sections.

Figure 8:
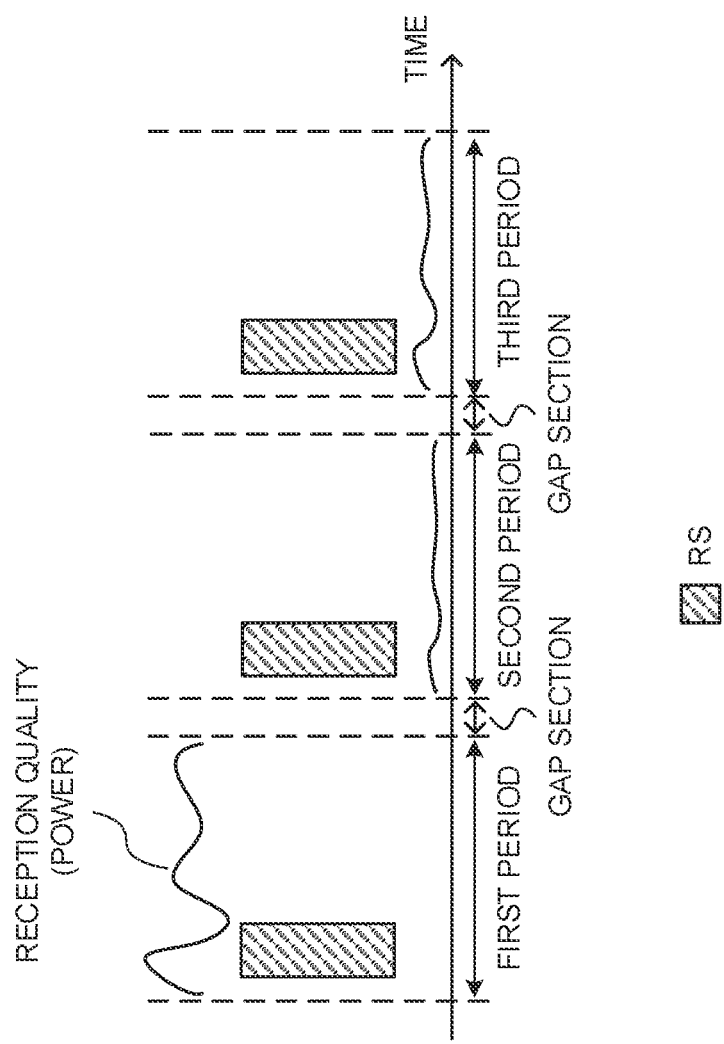
FIG. 8 is a diagram to show an example of correspondence of the relay direction application time sections, the reference signals, and the reception qualities.

FIG. 8 is a diagram to show an example of correspondence of the relay direction application time sections, the reference signals, and the reception qualities. As shown in FIG. 8, for example, the UE may assume that reception processing (for example, demodulation processing, decoding processing, or the like) for at least one of a PDSCH and a PDCCH in a second period cannot be performed by using a measurement result of an RS (for example, at least one of an SSB, a CSI-RS, and a TRS) in a first period. In other words, the UE may assume that channel estimation for at least one DMRS of the PDSCH and the PDCCH in the second period cannot be performed by using a measurement result of the RS in the first period. Note that reception quality (power) in FIG. 8 is similar to that in FIG. 3. Note that the mapping positions of RSs in FIG. 8 are only an example and are not restrictive.

By thus separately configuring (for example, not associating with each other) QC is for different periods, the UE can recognize information related to a QCL relation of different beams (beams of different relay directions).

<Third Aspect>

In a third aspect, control of a relay apparatus from a NW will be described. Note that a UE may receive a control indication from the NW to the relay apparatus to use the control indication for the control of the UE in the third aspect.

<<Aspect 3-1>>

At least one of a relay direction and a time section of the relay apparatus may be controlled through signaling from the NW. For example, at least one of the relay direction and the relay section of the relay apparatus may be controlled through at least one of a backhaul, a PDCCH, a PDSCH, RRC signaling, and MAC signaling.

At least one of an SS, a CORESET, and a CRC (Cyclic Redundancy Code)-scrambled radio network temporary identifier (RNTI) may be configured by the NW or defined in a specification, and downlink control information (DCI) may be used to control of at least one of the relay direction and the time section of the relay apparatus by the NW. As the DCI, DCI having the same length as DCI length in Rel. 15 or a previous version and dedicated to the relay apparatus may be defined in a specification.

The relay apparatus may change at least one of the relay direction and the time section of the relay apparatus, based on a certain rule or timing. The rule may be determined according to a correspondence relationship as shown in FIG. 9.

FIG. 9 is a diagram to show an example of a correspondence relationship of rules for the relay apparatus to determine the relay directions of the relay apparatus and relay direction application time sections. For example, the relay apparatus may control to repeatedly change at least one of the relay direction and the time section of the relay apparatus, based on one or a plurality of sets of a time section and timing included in a correspondence relationship as that shown in FIG. 9. The interval (gap section) between different adjacent time sections may be defined in a specification in advance or may be included in a correspondence relationship as that shown in FIG. 9.

The correspondence relationship shown in FIG. 9 is only an example, and the number of the plurality of sets and constituent elements are not limited thereto. The relay apparatus may be notified of the correspondence relationship as that shown in FIG. 9 by the NW, or the corresponding relationship may be implemented in the relay apparatus in advance.

<<Aspect 3-2>>

In response to a control indication from the NW to the relay apparatus, the relay apparatus, including a transmission module, may transmit reply information to the NW.

The reply information may be transmitted via a certain UL channel, or the NW may be noted of the reply information through backhaul. The reply information may be transmission confirmation information (for example, Hybrid Automatic Repeat reQuest-ACKnowledge (HARQ-ACK)) or the like. The reply apparatus may receive a control indication from a network and transmit a signal such as reply information to the NW. The reply apparatus may notify the NW of information related to a relay direction pattern suitable for the relay apparatus for returning transmission confirmation information in response to a control indication from the NW.

The relay apparatus need not necessarily explicitly transmit transmission confirmation information or the like in response to the control indication from the NW to the relay apparatus.

For example, even in a case where no transmission confirmation information is transmitted from the relay apparatus to the NW, the NW may recognize whether the control indication from the NW to the relay apparatus is performed appropriately, based on a result report of CSI measurement from the UE.

Even when no transmission confirmation information is transmitted from the relay apparatus to the NW, the relay apparatus may implicitly notify the NW of transmission confirmation information by performing certain operation. The certain operation may be, for example, turning the relay direction to a certain direction after the elapse of a certain time period indicated by the NW or turning the relay direction to an indication direction from the NW. The NW may perform measurement of an uplink channel or an RS from the UE or causes the UE to measure CSI by using a DL RS and then report a result of the measurement, to thereby recognize whether a control indication from the NW to the relay apparatus has been performed appropriately.

<<Aspect 3-3>>

When a control indication to the relay apparatus is made by the NW, the UE may assume a timeline (period) of certain relay direction control.

FIGS. 10A and 10B are each a diagram to show an example of a timeline of operation of the relay apparatus. As shown in FIG. 10A, the relay apparatus receives a control indication from the NW and changes the relay direction to a first relay direction after the elapse of a certain time period. The period required for the change may be defined in a specification in advance, or the NW may notify the UE of the period. The period in which the relay direction is changed to the first relay direction may be a time period until a timer configured in advance or notified by the NW expires or may be a time required until the relay apparatus receives the next indication.

As shown in FIG. 10B, the total of the period in which the relay direction is changed to the first relay direction, a period in which the relay direction is changed to a second relay direction, and a period for changing from the first relay direction to the second relay direction (gap time) may be a time period until a timer configured in advance or notified by the NW expires or may be a time required until the relay apparatus receives the next indication.

Although the number of relay directions shown in FIGS. 10A and 10B is one or two, the number of relay directions may be three or more, and the period assumed by the UE may be determined based on the number of relay directions.

<Others>

The relay (reflection) direction in the present disclosure may be determined by the UE, based on a QCL relation.

For example, the relay (reflection) direction may be defined in a specification in advance, based on a QCL relation. For example, RSs having different relay directions may be determined not to have a QCL relation.

For example, a QCL type corresponding to the relay direction may be defined in a specification. The QCL type may be an existing (Rel. 15 or a previous version) QCL type or may be a QCL type newly defined in a specification.

Figure 11:
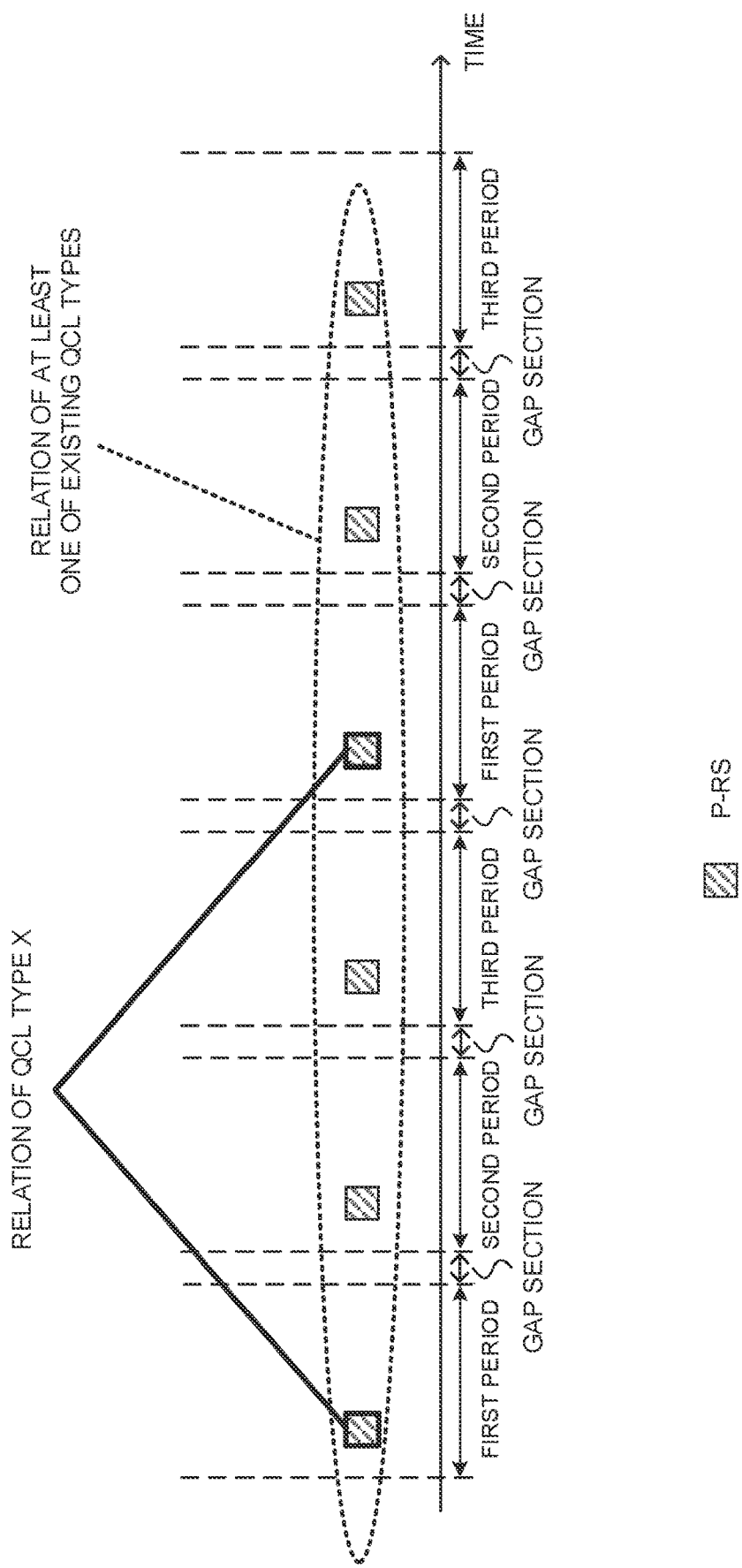
FIG. 11 is a diagram to show an example of a relationship between a periodic reference signal and a QCL type in each time section.

FIG. 11 is a diagram to show an example of a relationship between a periodic reference signal and a QCL type in each time section. As shown in FIG. 11, for example, all P-RSs in each period of the first to third periods have existing QCL types, and RSs having the same relay direction among the RSs may have a QCL type newly defined by specification (for example, QCL type X). The NW may notify the UE of the QCL type newly defined by use (for example, QCL type X). Note that the mapping positions of P-RSs in FIG. 11 are only an example and are not restrictive.

In this case, by receiving a P-RS, the UE can recognize a corresponding time section.

The RSs in the entire time section may be configured to have a relation of QCL type A with each other by using an existing (Rel. 15 or a previous version) QCL type, or the RSs having the same direction may be configured to have QCL type D.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 12:
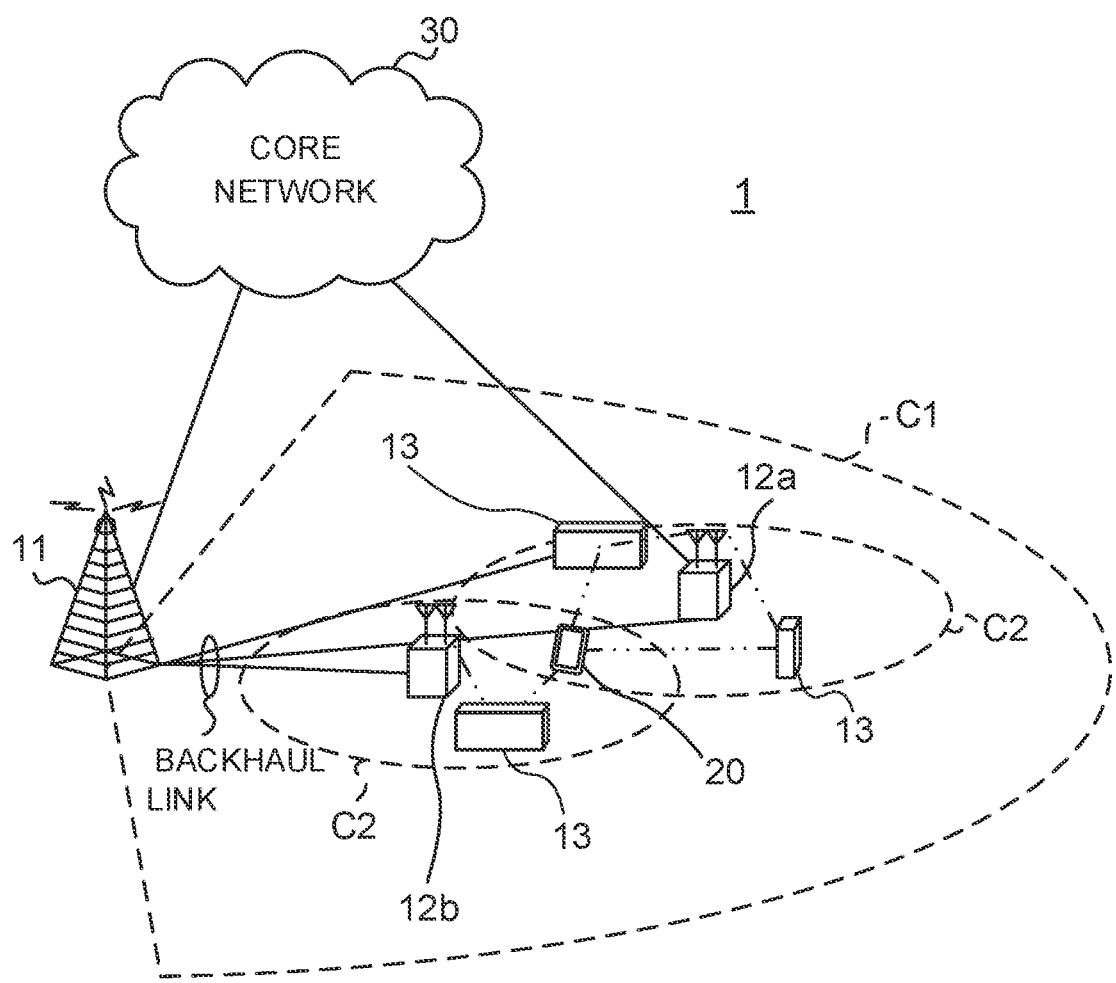
FIG. 12 is a diagram to show an example of a schematic structure of a radio communication system according to one embodiment.

FIG. 12 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a and 12b) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

In the macro cell C1 and the small cell C2, one or more relay apparatuses 13 may be located. The user terminal 20 may communicate with the base station 12 via the one or more relay apparatuses 13 in a corresponding cell. The relay apparatus 13 may be geologically fixed or may be movable.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 and the relay apparatus(es) 13 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base stations 10 and the relay apparatus(es) 13 may be connected to a core network 30 through another one of the base stations 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 13:
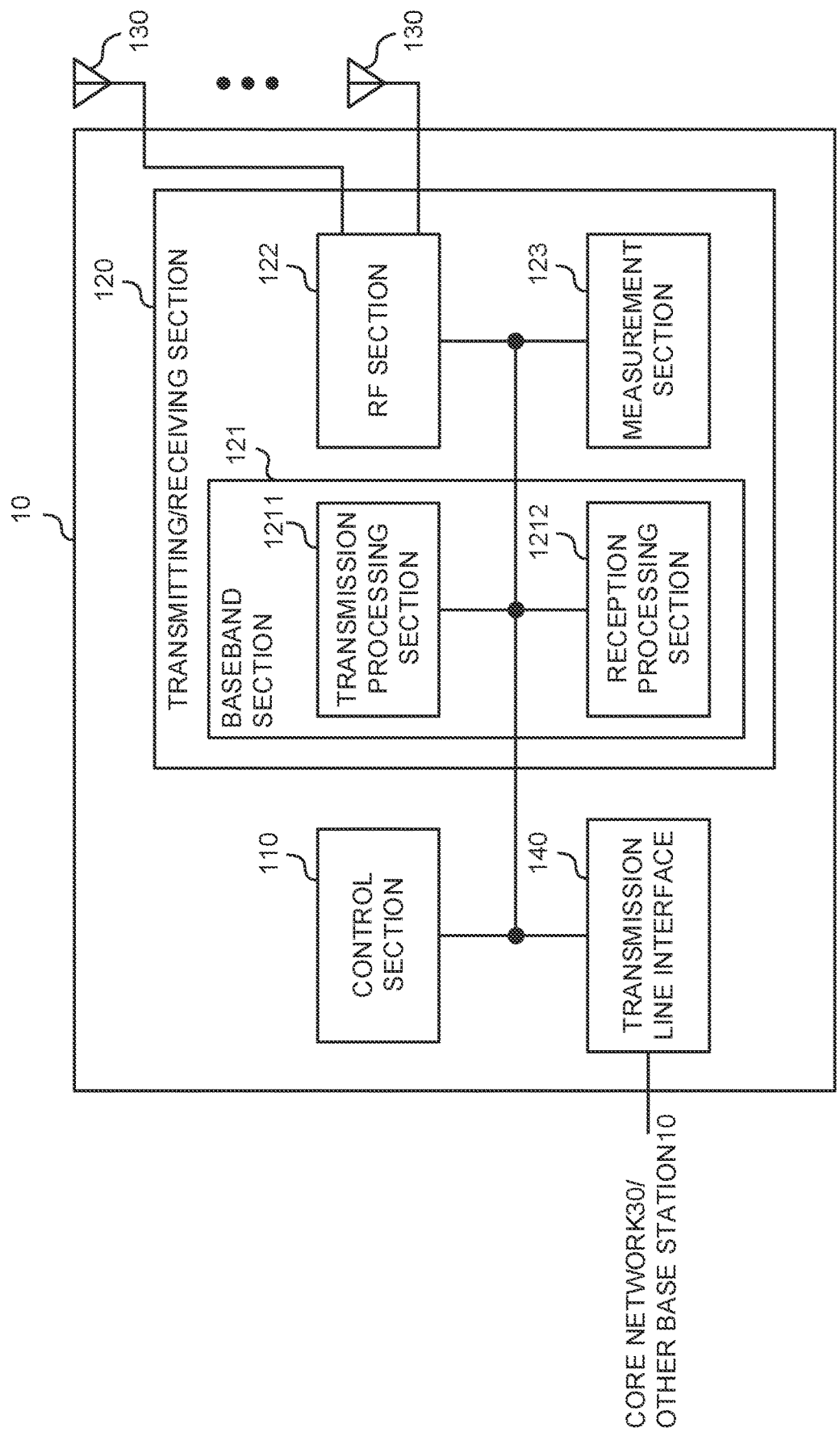
FIG. 13 is a diagram to show an example of a structure of a base station according to one embodiment.

FIG. 13 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that part of the structure or the entire structure of the base station of the present example is also applicable to the relay apparatus of the present disclosure. The present example primarily shows functional blocks that pertain to characteristic parts of the present embodiment and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit at least part of DL transmission via the relay apparatus. The transmitting/receiving section 120 may transmit information related to the relay apparatus (the first aspect and the second aspect).

The transmitting/receiving section 120 may transmit information related to quasi-co-location configured separately for each of a plurality of periods (Aspect 2-5 and others).

(User Terminal)

Figure 14:
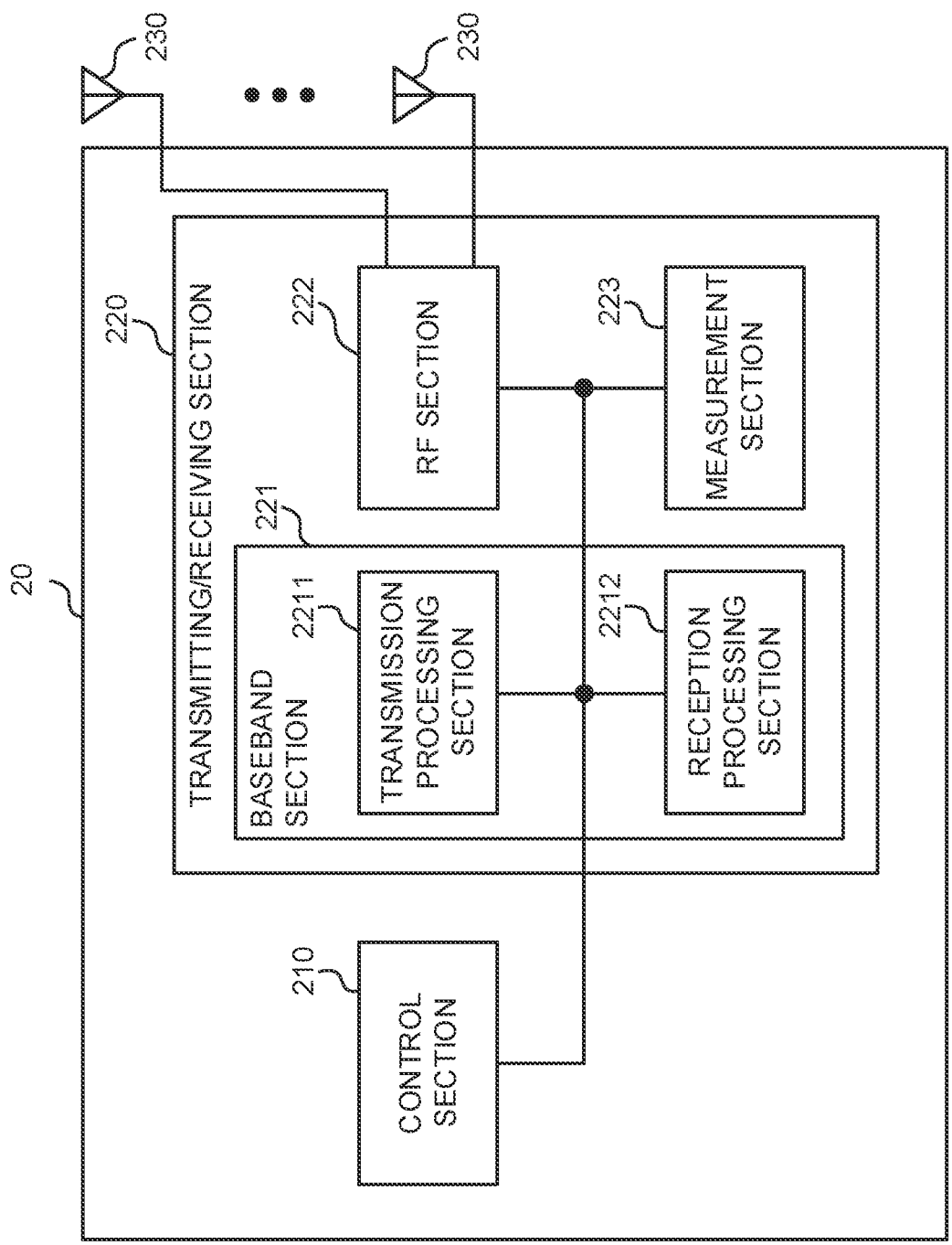
FIG. 14 is a diagram to show an example of a structure of a user terminal according to one embodiment.

FIG. 14 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that part of the structure or the entire structure of the user terminal of the present example is also applicable to the relay apparatus of the present disclosure. The present example primarily shows functional blocks that pertain to characteristic parts of the present embodiment and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive at least part of DL transmission transmitted through a network, via the relay apparatus. The control section 210 may control reception of the DL transmission, based on at least one of information related to the relay apparatus transmitted from the network and reception qualities of the plurality of periods (the first aspect and the second aspect).

The control section 210 may selectively perform at least one of radio link monitoring (RLM), measurement of channel state information (CSI), detection of a downlink control channel (PDCCH), and assumption of scheduling of a physical shared channel in one or more periods of the plurality of periods (Aspect 2-1, Aspect 2-2, Aspect 2-3, and Aspect 2-4).

The control section 210 may perform at least one of radio link monitoring (RLM), measurement of channel state information (CSI), detection of a downlink control channel (PDCCH), and assumption of scheduling of a physical shared channel in the plurality of periods (Aspect 2-1, Aspect 2-2, Aspect 2-3, and Aspect 2-4).

The transmitting/receiving section 220 may receive information related to quasi-co-location configured separately for each of the plurality of periods. The control section 210 may perform control by which DL transmission transmitted from the network is received in at least one of the plurality of periods (Aspect 2-5 and others).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 15:
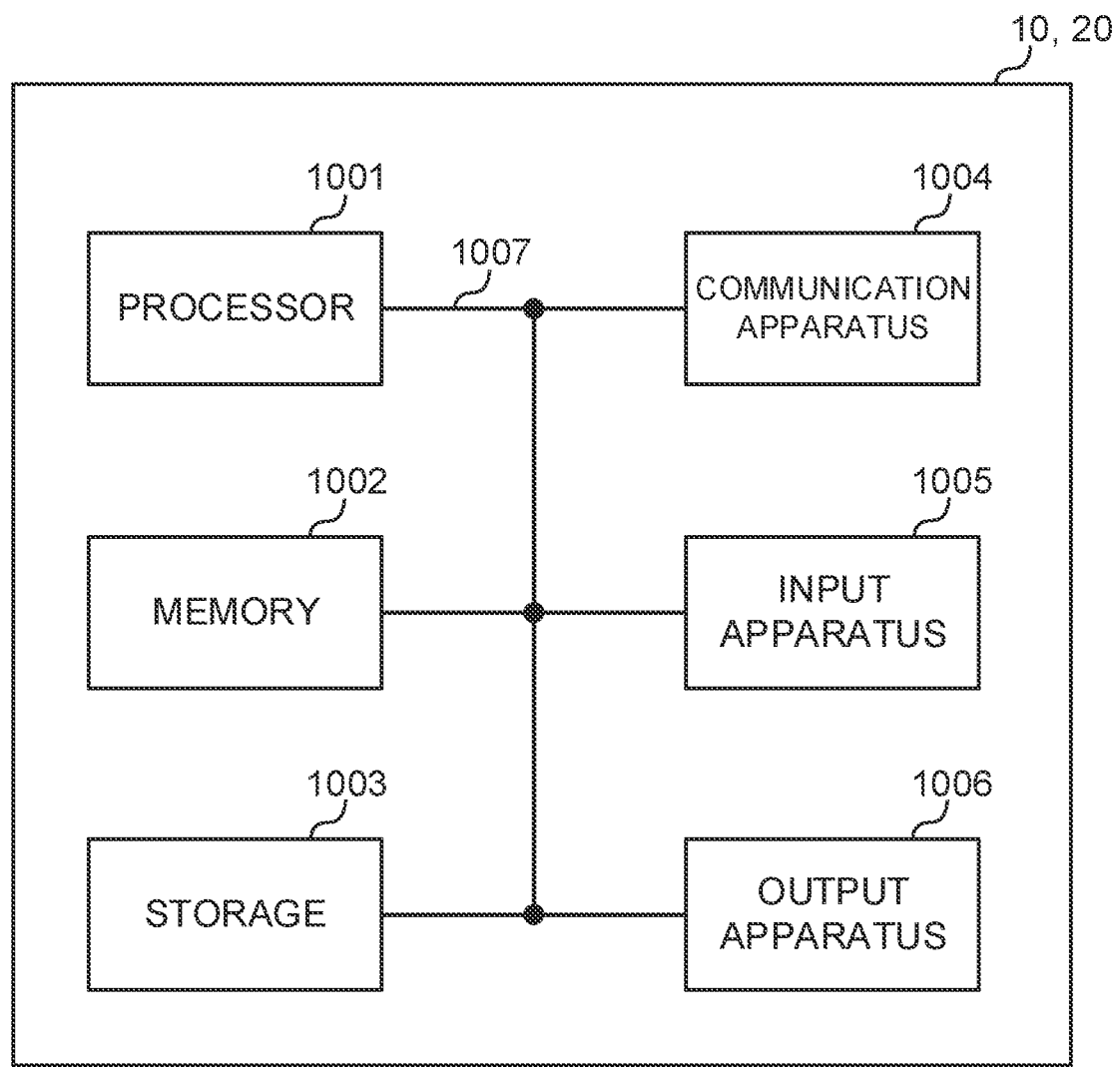
FIG. 15 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 15 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks maybe implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy® disk, a magneto-optical disk (for example, a compact disc (Compact Disc ROM (CD-ROM) and so on), a digital versatile disc, a Blu-ray® disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on maybe implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 maybe be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a"mind-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RB may be referred to as a "physical resource block (Physical RB (PRB))," a "subcarrier group (SCG)," a "resource element group (REG),"a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP ".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety or different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting' of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality or cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM®), CDMA 2000, Ultra Mobile Broadband (UMB), IEEE 802.11 (Wi-Fi®), IEEE 802.16 (WiMAX®), IEEE 802.20, Ultra-WideBand (UWB), Bluetooth®, systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A radio communication apparatus comprising:
   a receiving section that receives control information for controlling a relay of a signal transmitted between a base station and a terminal; and
   a control section that controls the relay of the signal based on the control information,
   wherein the control information includes:
      information related to a beam for the relay of the signal, and
      information related to periodic relay of the signal, the information related to periodic relay of the signal indicating:
         a length of a period for the relay of the signal,
         a cycle of the period of the relay of the signal, and
         a gap between adjacent periods in the periodic relay of the signal,
   wherein the receiving section receives Medium Access Control (MAC) signaling or receives downlink control information (DCI) on a physical downlink control channel (PDCCH) for a relay apparatus,
   wherein the control section controls the beam for the relay of the signal transmitted between the base station and the terminal based on the MAC signaling or based on the DCI for the relay apparatus, and
   wherein the terminal is distinct from an Integrated Access Backhaul (IAB) node.

2. The radio communication apparatus according to claim 1, wherein:
   the receiving section receives the control information by higher layer signaling, and
   further comprises a transmitting section that transmits transmission confirmation information in response to the reception of the control information.

3. The radio communication apparatus according to claim 1, wherein:
   the receiving section receives the MAC signaling, and
   the control section controls at least one of the beam for the relay of the signal and a time section based on the MAC signaling.

4. The radio communication apparatus according to claim 1, wherein:
   the receiving section receives the DCI for the relay apparatus, and
   the control section controls at least one of the beam for the relay of the signal and a time section based on the DCI for the relay apparatus.

5. A radio communication method for a radio communication apparatus, the method comprising:
   receiving control information for controlling a relay of a signal transmitted between a base station and a terminal;
   controlling the relay of the signal based on the control information,
   wherein the control information includes:
      information related to a beam for the relay of the signal, and
      information related to periodic relay of the signal, the information related to periodic relay of the signal indicating:
         a length of a period for the relay of the signal,
         a cycle of the period of the relay of the signal, and
         a gap between adjacent periods in the periodic relay of the signal;
   receiving Medium Access Control (MAC) signaling or receiving downlink control information (DCI) on a physical downlink control channel (PDCCH) for a relay apparatus; and
   controlling the beam for the relay of the signal transmitted between the base station and the terminal based on the MAC signaling or based on the DCI for the relay apparatus,
   wherein the terminal is distinct from an Integrated Access Backhaul (IAB) node.

6. A base station comprising:
   a transmitting section that transmits control information for controlling, by a radio communication apparatus, a relay of a signal transmitted between the base station and a terminal; and
   a control section that controls, by the control information, the relay of the signal by the radio communication apparatus,
   wherein the control information includes:
      information related to a beam for the relay of the signal, and
      information related to periodic relay of the signal, the information related to periodic relay of the signal indicating:
         a length of a period for the relay of the signal,
         a cycle of the period of the relay of the signal, and
         a gap between adjacent periods in the periodic relay of the signal,
   wherein the transmitting section transmits Medium Access Control (MAC) signaling or transmits downlink control information (DCI) on a physical downlink control channel (PDCCH) for a relay apparatus,
   wherein the control section controls the beam for the relay of the signal transmitted between the base station and the terminal based on the MAC signaling or based on the DCI for the relay apparatus, and
   wherein the terminal is distinct from an Integrated Access Backhaul (IAB) node.

7. A system comprising a terminal, a radio communication apparatus, and a base station, wherein the radio communication apparatus includes:
   a receiving section that receives control information for controlling a relay of a signal transmitted between the base station and the terminal; and a control section that controls the relay of the signal based on the control information, wherein the control information includes:
  information related to a beam for the relay of the signal, and
  information related to periodic relay of the signal, the information related to periodic relay of the signal indicating:
    a length of a period for the relay of the signal,
    a cycle of the period of the relay of the signal, and
    a gap between adjacent periods in the periodic relay of the signal, wherein the receiving section receives Medium Access Control (MAC) signaling or receives downlink control information (DCI) on a physical downlink control channel (PDCCH) for a relay apparatus, wherein the control section controls the beam for the relay of the signal transmitted between the base station and the terminal based on the MAC signaling or based on the DCI for the relay apparatus, and wherein the terminal is distinct from an Integrated Access Backhaul (IAB) node.

\* \* \* \* \*